US008943690B2

(12) United States Patent
Ishida et al.

(10) Patent No.: US 8,943,690 B2
(45) Date of Patent: Feb. 3, 2015

(54) METHOD FOR MANUFACTURING SUBSTRATE FOR LIQUID EJECTION HEAD AND METHOD FOR MANUFACTURING LIQUID EJECTION HEAD

(75) Inventors: Yuzuru Ishida, Yokohama (JP); Takuya Hatsui, Tokyo (JP); Kazuaki Shibata, Oita (JP); Takeru Yasuda, Kawasaki (JP); Ryoji Oohashi, Yokohama (JP); Yoshiyuki Imanaka, Kawasaki (JP); Koichi Omata, Kawasaki (JP); Hideo Tamura, Kawasaki (JP); Kousuke Kubo, Kawasaki (JP); Yuji Tamaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 13/216,069

(22) Filed: Aug. 23, 2011

(65) Prior Publication Data

US 2012/0047737 A1 Mar. 1, 2012

(30) Foreign Application Priority Data

Aug. 26, 2010 (JP) ................................ 2010-189512

(51) Int. Cl.
*B21D 53/76* (2006.01)
*B23P 17/00* (2006.01)
(Continued)

(52) U.S. Cl.
CPC ............ *B41J 2/1404* (2013.01); *B41J 2/14129* (2013.01); *B41J 2/1603* (2013.01);
(Continued)

(58) Field of Classification Search
CPC ........ B41J 2/14; B41J 2/14056; B41J 2/1408; B41J 2/14088; B41J 2/14112; B41J 2/14129; B41J 2/1603; B41J 2/162; B41J 2/1621; B41J 2/1629; B41J 2/3359; B41J 2/16579; G01R 1/07328; G01R 17/00
USPC ............ 29/25.35, 593, 890.1; 347/54, 68, 69, 347/70, 71, 72; 156/252, 292; 216/26, 27
See application file for complete search history.

(56) References Cited

U.S. PATENT DOCUMENTS 5,250,931 A * 10/1993 Misawa et al. ................ 345/206
6,799,831 B2 * 10/2004 Inamoto et al. ................ 347/44
(Continued)

FOREIGN PATENT DOCUMENTS

EP 1125745 A2 8/2001
JP 02-078555 A 3/1990
(Continued)

*Primary Examiner* — Paul D Kim
(74) *Attorney, Agent, or Firm* — Canon USA Inc IP Division

(57) ABSTRACT

When protective portions are independently provided for each energy generation element, a leakage current inspection between the protective portions and the energy generation elements cannot be performed at once. Therefore, there is a concern that the inspection in manufacturing a substrate for liquid ejection head requires time. Therefore, the substrate for liquid ejection head is manufactured by performing a leakage current inspection between a connecting portion that is electrically connected to plurality of protective portions and a terminal to which the plurality of energy generation elements are connected, and thereafter removing the connecting portion.

10 Claims, 9 Drawing Sheets

(51) Int. Cl.
*B41J 2/14* (2006.01)
*B41J 2/16* (2006.01)

(52) U.S. Cl.
CPC ............. *B41J 2/1628* (2013.01); *B41J 2/1629* (2013.01); *B41J 2/1631* (2013.01); *B41J 2/1639* (2013.01); *B41J 2/1642* (2013.01); *B41J 2/1646* (2013.01)
USPC ........... 29/890.1; 29/25.35; 29/593; 156/252; 156/292; 347/54; 347/68; 347/69; 347/70; 347/71

(56) References Cited

U.S. PATENT DOCUMENTS

| | | | | |
|---|---|---|---|---|
| 7,287,838 | B2 | 10/2007 | Tsuchii | |
| 7,588,317 | B2 * | 9/2009 | Imanaka et al. | 347/48 |
| 8,104,875 | B2 * | 1/2012 | Nagata | 347/63 |
| 8,205,963 | B2 * | 6/2012 | Goto et al. | 347/47 |
| 8,292,407 | B2 * | 10/2012 | Hirayama et al. | 347/58 |
| 2002/0071004 | A1 | 6/2002 | Kaneko | |
| 2004/0012654 | A1 | 1/2004 | Takeuchi | |
| 2007/0211115 | A1 * | 9/2007 | Ibe et al. | 347/58 |

FOREIGN PATENT DOCUMENTS

| | | | |
|---|---|---|---|
| JP | 08-295019 | A | 11/1996 |
| JP | 10-157112 | A | 6/1998 |
| JP | 2001-232776 | A | 8/2001 |
| JP | 2002-011882 | A | 1/2002 |
| JP | 2004-050646 | A | 2/2004 |
| JP | 2007-290327 | A | 11/2007 |

* cited by examiner

METHOD FOR MANUFACTURING SUBSTRATE FOR LIQUID EJECTION HEAD AND METHOD FOR MANUFACTURING LIQUID EJECTION HEAD

BACKGROUND OF THE INVENTION

1. Field of the Invention

The present invention relates to a method for manufacturing a substrate for liquid ejection head and a method for manufacturing a liquid ejection head.

2. Description of the Related Art

As a typical liquid ejection head for use in liquid ejection devices, a liquid ejection head having a substrate for liquid ejection head having plurality of energy generation elements that generate thermal energy to be utilized for ejecting liquid and an ejection port member having a liquid ejection port can be mentioned. For the energy generation elements, a heat generation electrical resistance layer that generates heat by energization is used. The heat produced from the heat generation electrical resistance layer causes the generation of bubbles in liquid, and the liquid is ejected from the ejection port by the pressure of the bubbles.

The energy generation elements are covered with an insulating layer containing an insulating material, and a protective layer containing metal materials, such as tantalum, iridium, or ruthenium, is provided on the insulating layer in order to protect the energy generation elements from cavitation impact associated with disappearance of bubbles or chemical action caused by liquid. When the insulating layer of the liquid ejection head has a hole (pinhole), the energy generation elements and the protective layer enter a conductive state, which raises concern that desired heat generation properties are not obtained or an electrochemical reaction occurs between the protective layer and liquid, and therefor the protective layer deteriorates to reduce the durability or is eluted. Therefore, it is required to inspect the insulation between the energy generation elements and the protective layer in a stage of manufacturing a substrate for liquid ejection head.

Japanese Patent Laid-Open No. 2004-50646 discloses a method for inspecting insulation using an inspection terminal connected to a protective layer that is provided in the shape of a belt in such a manner as to protect plurality of energy generation elements in common and an inspection terminal connected to the plurality of energy generation elements in common. According to the method, the plurality of energy generation elements can be collectively inspected for the insulation by an insulating layer.

However, in the structure disclosed in Japanese Patent Laid-Open No. 2004-50646, when a hole is formed in the insulating layer corresponding to one energy generation element due to the influence of cavitation during recording or the like, so that the protective layer and the energy generation elements enter a conductive state, a current flows also to the protective layer covering the other energy generation elements. Therefore, the entire protective layer causes an electrochemical reaction with liquid, which causes deterioration in the protective layer on the plurality of energy generation elements in common.

In order to overcome the problem, it is considered that the protective layer is electrically disconnected from each other and independently provided for each energy generation element. However, in such a case, the inspection for confirming the insulation between the protective portions and the energy generation elements need to be performed for each energy generation element, which requires a huge number of inspection terminals and huge time for the inspection. Thus, the efficiency is not good.

SUMMARY OF THE INVENTION

The present invention provides a method for manufacturing a substrate for a liquid ejection head including a plurality of energy generation elements, an insulating layer provided to cover the plurality of energy generation elements, and a plurality of protective portions for protecting the plurality of energy generation elements which contain a metal material and which are provided in such a manner as to cover the insulating layer corresponding to each of the plurality of energy generation elements, which the method includes the step of preparing a base having an inspection terminal for inspecting the insulation between the plurality of energy generation elements and the plurality of protective portions and a connecting portion that electrically connects the inspection terminal and the plurality of protective portions, inspecting conduction between the inspection terminal and the plurality of energy generation elements in order to inspect the insulation, and electrically disconnecting the plurality of protective portions from each other while removing at least one portion of the connecting portion.

According to the present invention, a method for manufacturing a substrate for liquid ejection head in which even when one of the energy generation elements and the protective layer therefor enter a conductive state, an electrochemical reaction of the protective layer is not transmitted to the other plurality of energy generation elements can be provided. Furthermore, the insulation between the protective portions and the energy generation elements can be efficiently confirmed.

Further features of the present invention will become apparent from the following description of exemplary embodiments with reference to the attached drawings.

DESCRIPTION OF THE EMBODIMENTS

Figure 1A:
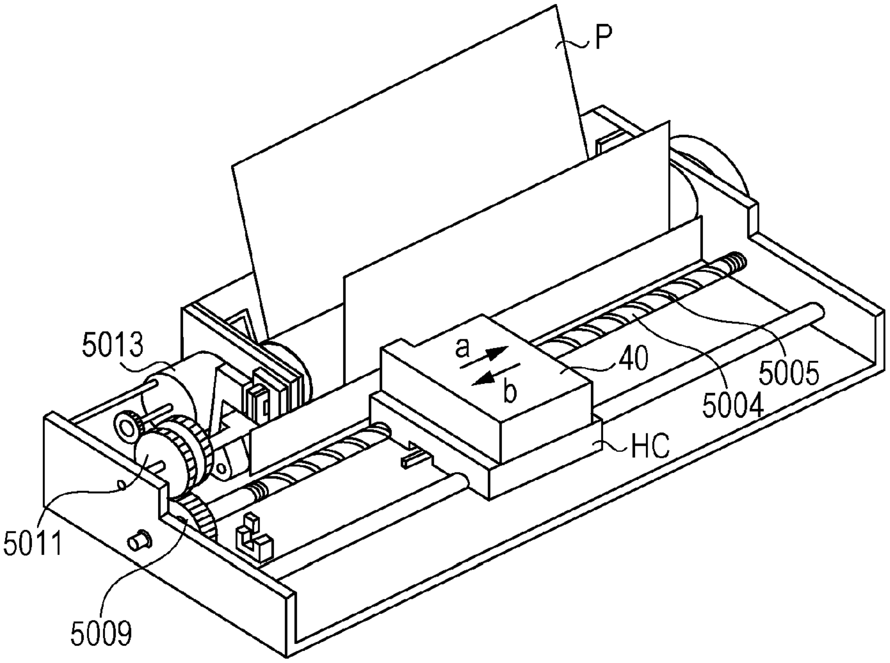
FIGS. 1A and 1B are views illustrating an example of a liquid ejection device and a liquid ejection head unit capable of using a liquid ejection head.

A liquid ejection head can be mounted on apparatuses, such as a printer, a copier, a facsimile machine having a communication system, and a word processor having a printer and further on industrial recording apparatuses integrally combined with various processing apparatuses. The use of the liquid ejection head allows recording on various types of recording media, such as paper, thread, fiber, textile, leather, metal, plastic, glass, wood, and ceramic.

The term “recording” as used in this specification includes not only forming images having meanings, such as letters or figures on target recording media, but also forming images not having meanings, such as patterns.

The “ink” should be broadly interpreted and refers to liquid that is given to target recording media, and thus is subjected to the formation of images, designs, patterns, and the like, processing of target recording media, or treatment of ink or target recording media. Here, the treatment of ink or target recording media refers to an improvement of fixability due to solidification or insolubilization of coloring materials in ink applied to target recording media, an improvement of recording quality and color developability, an improvement of image durability, and the like.

Hereinafter, the embodiments of the invention will be described with reference to the drawings. In the following description, the components having the same function are designated by the same reference numerals and the description therefor may be omitted.

Liquid Ejection Device

FIG. 1A is a schematic view illustrating a liquid ejection device on which the liquid ejection head according to the invention can be mounted.

As illustrated in FIG. 1A, a lead screw 5004 rotates through driving force transmitting gears 5011 and 5009 in synchronization with regular and reversible rotation of a drive motor 5013. A carriage HC allows mounting of a head unit thereon and has a pin (not illustrated) that engages with a spiral groove 5005 of the lead screw 5004, so that the carriage HC is reciprocated in the directions indicated by the arrows “a” and “b” by the rotation of the lead screw 5004. On the carriage HC, a head unit 40 is mounted.

Head Unit

Figure 1B:
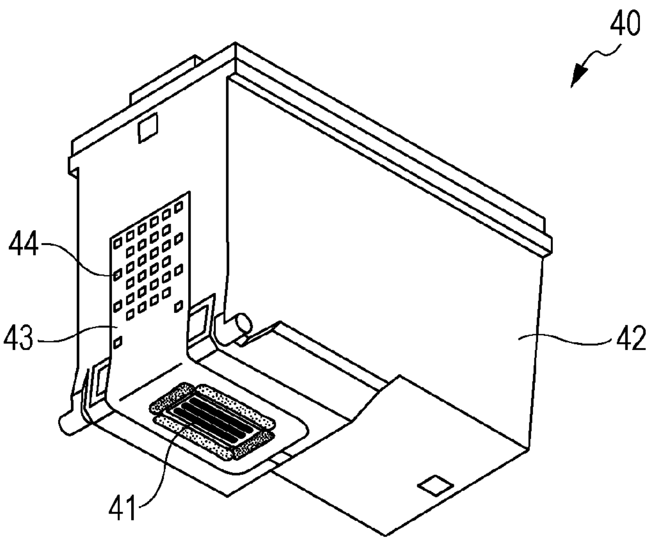

FIG. 1B is a perspective view of the head unit 40 that can be mounted on a liquid ejection device as illustrated in FIG. 1A. A liquid ejection head 41 (hereinafter also referred to as a “head”) is conducting to a contact pad 44 connected to the liquid ejection device through a flexible circuit board 43. The head 41 is joined to an ink tank 42 to be unified, thereby constituting a head unit 40. The head unit 40 illustrated here as an example is one in which the ink tank 42 and the head 41 are unified but can also be a separate type in which the ink tank can be separated.

Liquid Ejection Head

Figure 2A:
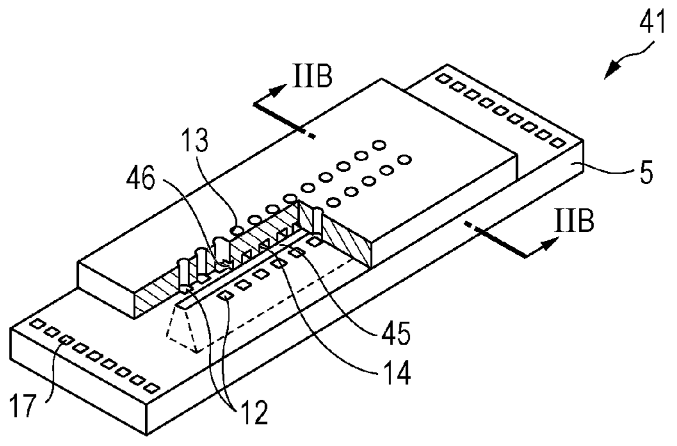
FIGS. 2A to 2C are a perspective view and cross sectional views of the liquid ejection head.
Figure 2B:
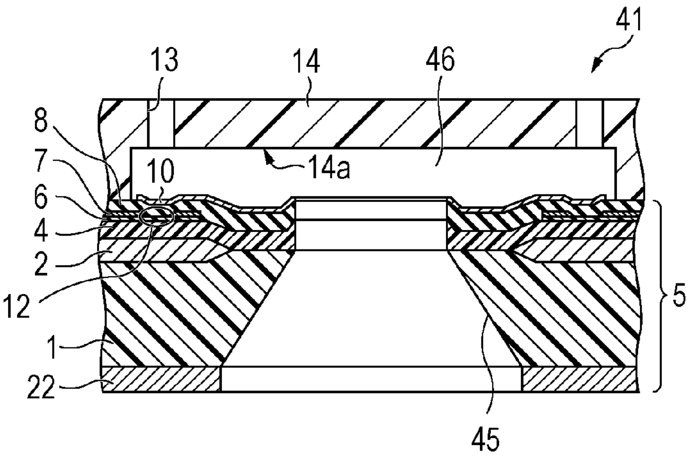
Figure 2C:
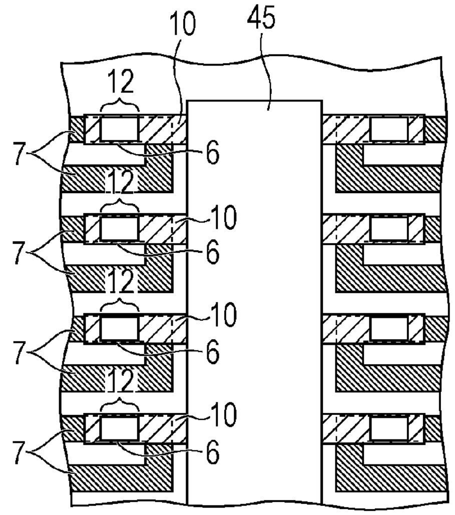

FIG. 2A illustrates a perspective view of the liquid ejection head 41 according to the invention. FIG. 2B is a cross sectional view schematically illustrating a state of a cut surface when the liquid ejection head 41 is cut perpendicularly to a substrate 5 along the IIB-IIB' line of FIG. 2A. FIG. 2C is a schematic view illustrating a state of the surface of a base 1 when energy generation elements 12 and the circumference thereof on the surface of the base 1 are viewed from the top of the base 1. The liquid ejection head 41 has a substrate for liquid ejection head 5 having the energy generation elements 12 that generate thermal energy to be utilized for ejecting liquid and a flow path wall member 14 provided on the substrate for liquid ejection head 5. The arrangement density of the energy generation elements is about 1200 dpi. The flow path wall member 14 can be formed with a cured substance of thermosetting resin, such as epoxy resin, and has ejection ports 13 for ejecting liquid and a wall 14*a* of the flow path 46 communicating with the ejection ports 13. Due to the fact that the flow path wall member 14 touches the substrate for liquid ejection head 5 with the wall 14*a* at the inside, the flow path 46 is provided. The ejection ports 13 provided in the flow path wall member 14 are provided in such a manner as to form a line with a given pitch along a supply port 45. Liquid supplied from the supply port 45 is conveyed to the flow path 46, and the liquid boils by the thermal energy generated from the energy generation elements 12 to thereby generate bubbles. The liquid is ejected from the ejection port 13 due to the pressure produced then, and thus recording operation is performed. The liquid ejection head 41 further has the supply port 45 provided penetrating the substrate for liquid ejection head 5 in order to supply liquid to the flow path 46 and terminals 17 that are electrically connected to the outside, e.g., the liquid ejection device.

As illustrated in FIG. 2B, a thermal oxidation layer 2 that is provided by partially thermally oxidizing the base 1 and a heat storage layer 4 containing a silicon compound are provided on the base 1 containing silicon on which driving elements, such as a transistor, are provided. On the heat storage layer 4, a heat generation electrical resistance layer 6 containing materials that generate heat by energization (e.g., TaSiN or WSiN) is provided and a pair of electrodes 7 containing aluminum whose resistance is lower than that of the heat generation electrical resistance layer as the main ingredients are provided in such a manner as to contact the heat generation electrical resistance layer 6. By applying a voltage between the pair of electrodes 7 to let the portion between the pair of electrodes 7 of the heat generation electrical resistance layer 6 generate heat, the portion of the heat generation electrical resistance layer 6 is used as the energy generation element 12. The heat generation electrical resistance layer 6 and the pair of electrodes 7 are covered with an insulating layer 8 containing insulating materials, such as a silicon compound, such as SiN, in order to achieve insulation from liquid, such as ink, to be ejected. Furthermore, in order to protect the energy generation elements 12 from the cavitation impact or the like caused by foaming and contraction of liquid for ejection, protective portions 10 used as a cavitation resistant layer are provided on the insulating layer 8 corresponding to the portion of each of the energy generation elements 12. Specifically, for the protective portions 10, metal materials, such as tantalum, iridium, or ruthenium, can be used. Furthermore, the flow path wall member 14 is provided on the insulating layer 8. In order to increase the adhesion between the insulating layer 8 and the flow path wall member 14, an adhesion layer containing polyether amide resin or the like can also be provided between the insulating layer 8 and the flow path wall member 14. On the surface of the base 1 opposite to the surface on which the energy generation elements 12 are provided, a thermal oxidation layer 22 used as a mask during an etching process for forming the supply port 45 is left behind. As illustrated in FIG. 2C, the protective portions 10 are independently provided for each energy generation element 12. By providing the protective portions 10 as described above, even when a hole is formed in the insulating layer due to a certain factor during recording operation, so that the potential of the energy generation elements 12 and the potential of the protective portions 10 become the same potential, only the protective portion 10 covering one energy generation element 12 causes an electrochemical reaction, such as oxidization or dissolution. Specifically, when tantalum is used as the protective portion 10, the protective portion 10 oxidized and when iridium or ruthenium is used, the protective portion 10 is dissolves. The protective portion 10 covering the adjacent energy generation element 12 is electrically disconnected, and thus the electrochemical reaction is not transmitted to the adjacent energy generation element 12.

In contrast, during manufacturing, a connecting portion electrically connected to the plurality of protective portions 10 provided above the plurality of energy generation elements 12 is provided. The connecting portion is connected to an inspection terminal. By confirming the conduction between the plurality of energy generation elements using the inspection terminal, the insulation of the insulating layer located between the plurality of energy generation elements 12 and the protective portions 10 can be easily confirmed. More specifically, the connecting portion is used for electrically connecting each of the plurality of protective portions 10 and an inspection terminal 16. After the completion of such an inspection process, the connecting portion is cut to thereby separate the protective portion 10 for each energy generation element 12.

Thus, the insulation between the protective portions 10 and the energy generation elements 12 can be efficiently confirmed. Moreover, a substrate for liquid ejection head can be provided in which an electrochemical reaction of the protective portion can be prevented from transmitting to the plurality of energy generation elements even when one of the energy generation elements 12 and the protective portion 10 enter a conductive state.

Manufacturing processes of a method for manufacturing a liquid ejection head of embodiments of the invention will be specifically described below with reference to the drawings.

First Embodiment

Figure 3A:
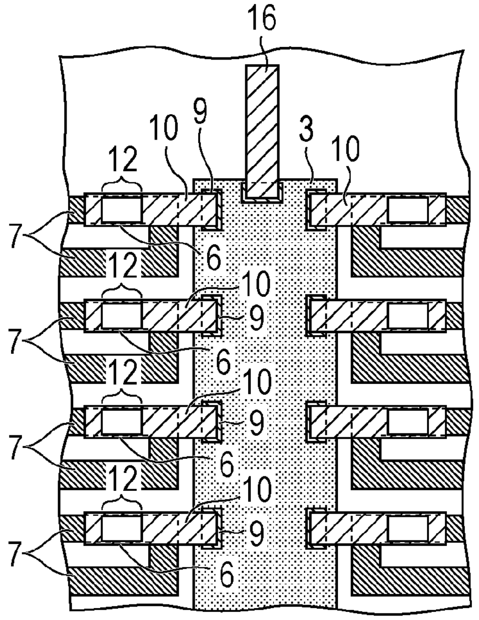
FIGS. 3A and 3B are views schematically illustrating the top view of a liquid ejection head.
Figure 3B:
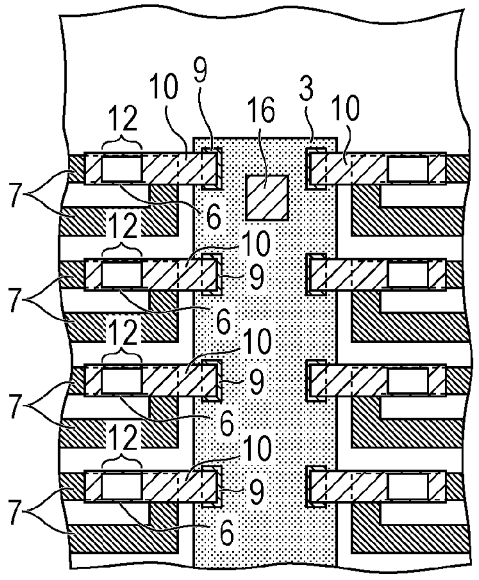
Figure 4A:
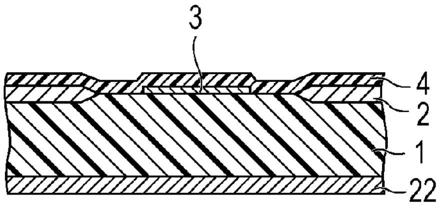
FIGS. 4A to 4G are views illustrating a method for manufacturing a liquid ejection head.

In this embodiment, a sacrificial layer used in order to specify the opening width of the supply port 45 is used as a connecting portion. FIGS. 3A and 3B are top views each schematically illustrating the energy generation elements 12 and the portion in the vicinity thereof of the liquid ejection head 41 during manufacturing. FIGS. 4A to 4G are cross sectional views schematically illustrating the state of the cut surface in each process when the liquid ejection head 41 is cut perpendicularly to the substrate 5 along the IIB-IIB' line of FIG. 2A. As illustrated in FIG. 4A, the base 1 is prepared which contains silicon having the front surface on which the thermal oxidation layer 2 used as a separation layer for driving elements, such as a transistor, is provided and the rear surface on which the thermal oxidation layer 22 used as the mask for providing the supply port 45 is provided. At a portion of the front surface where the supply port 45 is to be opened, the sacrificial layer 3 having a film thickness of about 200 nm to 500 nm is provided using a material that is promptly etched with an etching solution used for opening the supply port 45 and has conductivity. The sacrificial layer 3 can be formed at the position corresponding to the position of the supply port 45 using, for example, materials containing aluminum as the main ingredients (e.g., Al—Si alloy) or polysilicon by a sputtering method and a dry etching method. On the sacrificial layer 3, a heat storage layer 4 is provided which contains silicon oxide ($SiO_2$) and is formed with a film thickness of about 500 nm to 1 μm using a CVD method or the like.

Figure 4B:
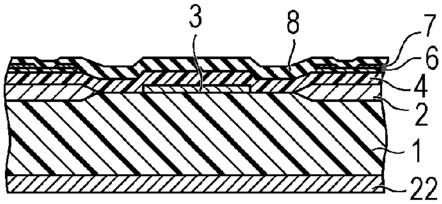

Next, the resistant layer 6 and the conductive layer of a pair of electrode 7 are formed on the heat storage layer 4 by a sputtering method. A material serving as the heat generation electrical resistance layer 6 contain TaSiN or WSiN, and the heat generation electrical resistance layer is having a film thickness of about 10 nm to 50 nm. A conductive layer contain aluminum as the main ingredients, the conductive layer is having a film thickness of about 100 nm to 1 μm serving as a pair of electrodes 7. Then, the heat generation electrical resistance layer 6 and the conductive layer are processed using a dry etching method, and further the conductive layer is partially removed by a wet etching method, thereby providing the pair of electrodes 7. The heat generation electrical resistance layer 6 corresponding to the portion where the conductive layer is removed is used as the energy generation element 12. Next, the insulating layer 8 containing silicon nitride (SiN) or the like and having insulation properties with a film thickness of about 100 nm to 1 μm is provided on the entire surface of the substrate using a CVD method or the like in such a manner as to cover the heat generation electrical resistance layer 6 or the pair of electrodes 7. Thus, the state illustrated in FIG. 4B is achieved.

Figure 4C:
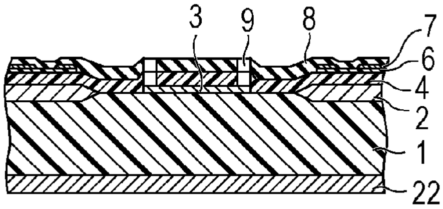
Figure 4D:
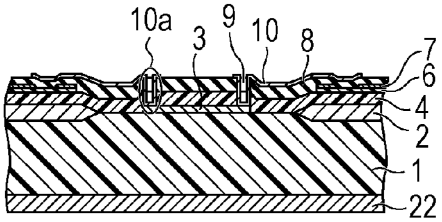

Next, through holes 9 are formed using a dry etching method in a part of the insulating layer 8 and a part of the heat storage layer 4 in such a manner that the sacrificial layer 3 is exposed. The through holes 9 are formed corresponding to the number of the energy generation elements 12 for each energy generation element (FIG. 4C).

Next, a conductive layer having a film thickness of 50 nm to 500 nm is formed using a sputtering method on the insulating layer 8 and the through holes 9 using materials having conductivity and durability capable of protecting from the cavitation shock or the like caused by foaming and contraction of liquid. Specifically, metal materials, such as tantalum, iridium, ruthenium, or chromium, can be used. Subsequently, the conductive layer is patterned to thereby form the protective portions 10, thereby obtaining the substrate for liquid ejection head 5 in the state illustrated in FIG. 4D. FIG. 3A illustrates a state when the front surface side of the substrate is viewed from the top. The plurality of protective portions 10 separately provided corresponding to each energy generation element 12 are electrically connected to the sacrificial layer 3 through the through holes 9. On the other hand, the protective portions 10 are electrically connected to the inspection terminal 16 provided at the substrate end for checking the insulation properties of the insulating layer 8.

Thus, the sacrificial layer 3 serves as a connecting portion for electrically connecting each of the plurality of protective portions 10 and the inspection terminal 16 on the base 1. The inspection terminal can be provided by patterning a part of the conductive layer serving as the protective portion 10 or removing the insulating layer 8 and the heat storage layer 4 located above the sacrificial layer 3 using a dry etching method to thereby expose the sacrificial layer 3. As illustrated in FIG. 3B, the terminal 16 may be provided on the sacrificial layer 3.

Next, a voltage is applied between the inspection terminal 16 and a terminal 17 (not illustrated here) electrically connected to the plurality of energy generation elements 12, the conduction between the heat generation electrical resistance layer 6 and the protective portions 10 is checked, thereby confirming the insulation by the insulating layer (inspection process). When it can be confirmed that the heat generation electrical resistance layer 6 and the protective portions 10 are not conducting, it is found that the insulation of the insulating layer 8 is secured.

Thus, by performing the inspection by providing the plurality of protective portions 10 in such a manner as to be connected to the one inspection terminal 16, it can be confirmed whether or not the plurality of protective portions are conducting by one conduction check, and thus the inspection of the insulating layer 8 covering the plurality of energy generation elements 12 can be efficiently performed. Furthermore, since plurality of inspection terminals are not required to be provided on the base 1, an increase in chip area can be suppressed and the manufacturing cost of the substrate for liquid ejection head 5 can be reduced.

Figure 4E:
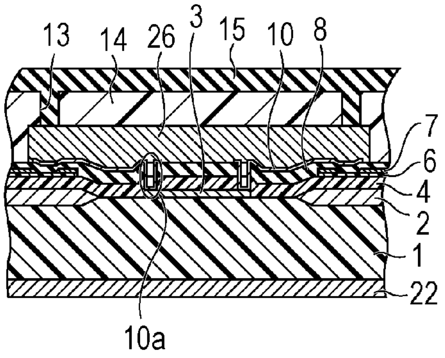

Dissolvable resin layer is formed on the surface of the substrate for liquid ejection head 5 after the completion of the inspection process using a spin coat method, and then patterned using a photolithographic technique to thereby form a die material 26 at a portion serving as the flow path 46. Furthermore, a cationic polymerization epoxy resin layer is formed on the die material 26 using a spin coat method, and then is baked using a hot plate to cure the resin, thereby forming the flow path wall member 14. Thereafter, the flow path wall member 14 at a portion serving as the ejection port 13 is removed using a photolithographic technique. Next, the flow path wall member 14 is protected with a cyclized rubber layer 15 (FIG. 4E).

Next, the thermal oxidation layer 22 on the surface of the base 1 opposite to the surface on which the energy generation elements 12 are provided is made to open in such a manner as to serve as a mask for forming the supply port 45. Furthermore, a wet etching method is performed from the rear surface of the base 1 using a tetramethyl ammonium hydroxide solution (TMAH solution), a potassium hydroxide solution (KOH solution), or the like to thereby form a penetration hole provided as the supply port 45 (supply port formation process). By the use of a silicon single crystal substrate having a surface crystal direction in the (100) plane as the base 1, the supply port 45 can be provided by crystal anisotropic etching using an alkaline solution (e.g., TMAH solution or KOH solution). In such a base, the etching rate in the (111) plane is extremely lower than the etching rate of other crystal planes, and therefore the supply port 45 having an angle of about 54.7° to the silicon substrate plane can be provided.

Figure 4F:
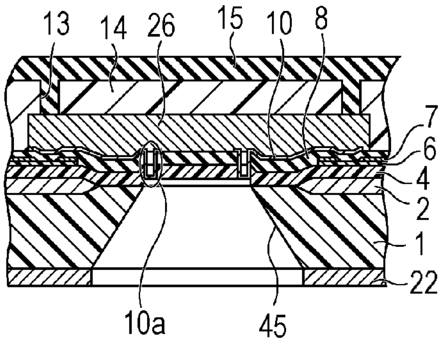

When etching is terminated when the sacrificial layer 3 is removed, a variation of the width of the supply port 45 caused by a variation of etching of silicon of the surface of the substrate for liquid ejection head 5 on which the energy generation elements 12 are provided can be reduced. Thus, the opening width of the supply port 45 of the surface of the substrate for liquid ejection head 5 on which the energy generation elements 12 are provided and which contacts the flow path wall member 14 can be easily specified. The sacrificial layer 3 is promptly etched with an etching solution for opening the supply port 45. Therefore, the sacrificial layer 3 is promptly removed when etching progresses until the sacrificial layer 3 is exposed. Thus, the opening width of the supply port can be specified, and thus the supply port 45 having favorable precision can be formed (FIG. 4F).

By the removal of the sacrificial layer 3 that is a connecting portion for electrically connecting the plurality of protective portions 10, the plurality of protective portions 10 corresponding to the plurality of energy generation elements 12 are individually electrically separated ((FIG. 2C) separation process). Thus, even when a hole is formed in the insulating layer 8 due to a certain factor during recording operation, one energy generation element 12 and the protective portion 10 therefor are merely conducting, and thus an electrochemical reaction, such as oxidization or elution, of the protective portion 10 can be prevented from transmitting to the protective portions that protect the other energy generation elements. The above-described structure can increase the reliability of the liquid ejection head.

In this embodiment, by providing the connecting portion 30 at the position where the supply port 45 is to be opened in this case, the formation of the supply port 45 and the removal of the connecting portion 30 can be collectively performed, which simplifies the manufacturing process.

Furthermore, the heat storage layer 4 and the insulating layer 8 located above the supply port 45 are removed using a dry etching method. In this case, when an end 10*a* buried in a through hole of the protective portion 10 and the inspection terminal 16 are not removed and remain when the over-etching amount is small. However, the end 10*a* and the inspection terminal 16 can also be removed by increasing the over-etching amount. By performing etching using gas that selectively etches only the protective portion 10, the protective portion can be provided in such a manner as to be located inside to the position (end) where the supply port 45 is opened. Thus, the protective portion 10 can be prevented from projecting to a portion where liquid supplied from the supply port 45 flows, and thus the protective portion 10 can be prevented from separating due to the flow of the liquid.

Figure 4G:
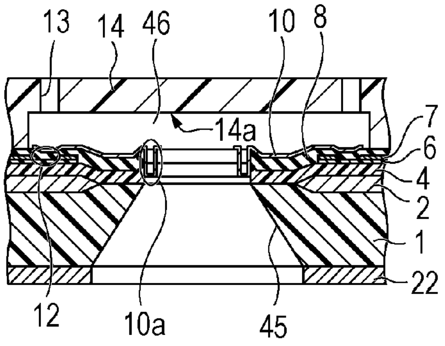

Thereafter, the cyclized rubber layer 15 and the die material 26 are removed, whereby the liquid ejection head 41 is completed (FIG. 4G).

Second Embodiment

The supply port 45 is formed using a wet etching method in the first embodiment but the supply port 45 can also be formed by etching the base 1 using a dry etching method as described in this embodiment. The structures other than the above are the same as those of the first embodiment.

Figure 5A:
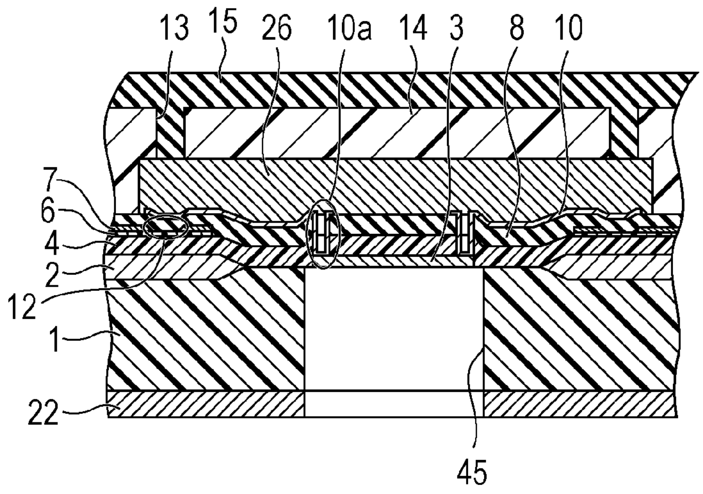
FIGS. 5A to 5C are views illustrating a method for manufacturing a liquid ejection head.

First, from FIGS. 4A to 4E, the layers are formed in the same manner as in the first embodiment, thereby preparing a base 1. Next, the base 1 of silicon is etched using a dry etching method, such as a Bosch process, until the sacrificial layer 3 is exposed (FIG. 5A). By the use of etching gas whose etching rate of silicon is high but whose etching rate of materials for use in the sacrificial layer 3 is low as etching gas for use in the etching, the sacrificial layer 3 can be used as an etching stop layer. By providing the supply port 45 using a dry etching method, the angle between the surface of the base 1 and the supply port 45 can be a substantially right angle, and the area of the substrate required for providing the supply port 45 can be reduced compared with that in the first embodiment.

Figure 5B:
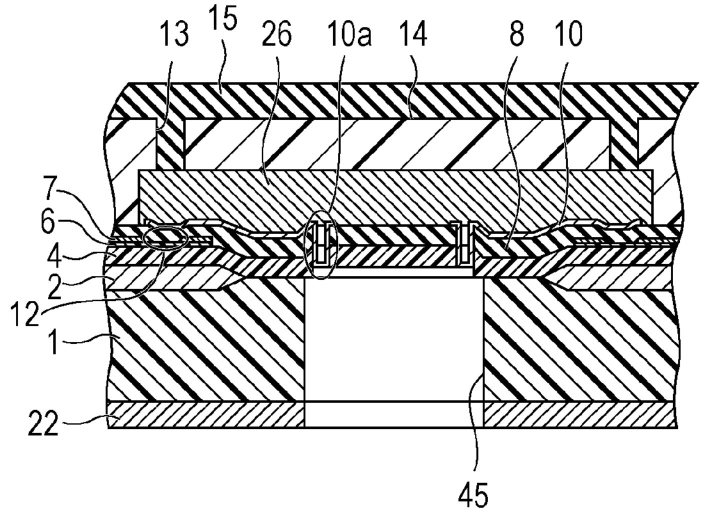

Next, the sacrificial layer 3 is removed using a tetramethyl ammonium hydroxide solution (TMAH), a potassium hydroxide solution (KOH), or the like (FIG. 5B). Thus, the opening width of the supply port can be specified, and the supply port 45 can be formed with favorable precision.

Figure 5C:
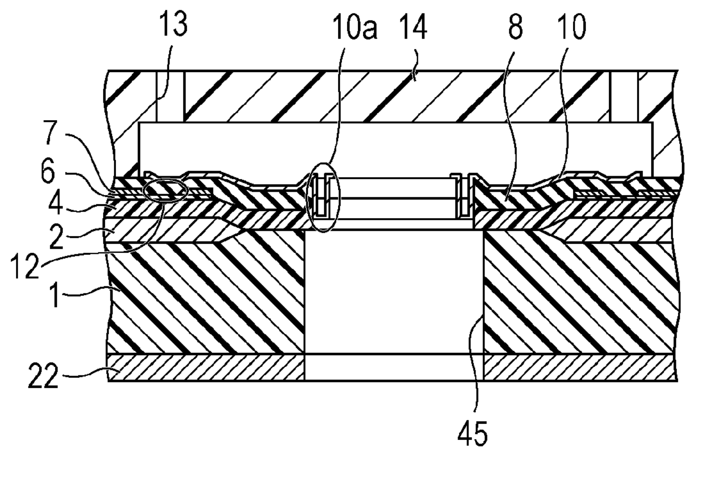

Thereafter, the cyclized rubber layer 15 and the die material 26 are removed, whereby the liquid ejection head 41 is completed (FIG. 5C). The supply port 45 can also be provided by combining laser processing, wet etching methods, and dry etching methods.

Third Embodiment

Figure 6A:
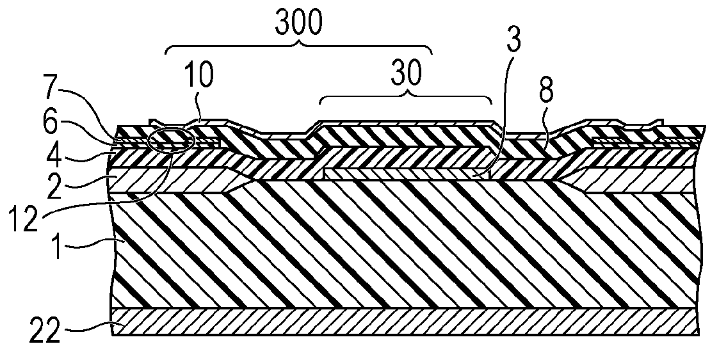
FIGS. 6A to 6C are views illustrating a method for manufacturing a liquid ejection head.

A third embodiment will be described with reference to FIGS. 6 and 7. FIGS. 6A to 6C are the same cross sectional views as FIGS. 4A to 4G and FIGS. 7A to 7D are top views schematically illustrating the energy generation elements 12 and the portion in the vicinity thereof of the liquid ejection head 41 during manufacturing.

The first and second embodiments describe different-form aspects in which the sacrificial layer 3 is used as the connecting portion 30 and the connecting portion 30 and the protective portion 10 are formed with different materials. This embodiment describes an aspect in which the connecting portion 30 is provided on the insulating layer 8 using the same materials as in the protective portion 10.

From FIGS. 4A to 4B, each laminated film is provided on the base 1 in the same manner as in the first embodiment.

Next, a metal material layer having a film thickness of 50 nm to 500 nm is formed by a sputtering method on the insulating layer 8 using materials having conductivity and having durability capable of protecting from cavitation shock or the like caused by foaming and contraction of liquid. Specifically, metal materials, such as tantalum, iridium, ruthenium, chromium, and platinum, can be used. The metal material layer is processed, using an etching technique, into protective portions each disposed in such a manner as to be located above each of the plurality of energy generation elements 12 and the connecting portion 30 as a connecting portion which is located inside a region 45*a* where the supply port 45 is opened and is connected to the plurality of protective portions. The protective portions and the connecting portion 30 are referred to as a metal layer 300 below (FIG. 6A).

Figure 7A:
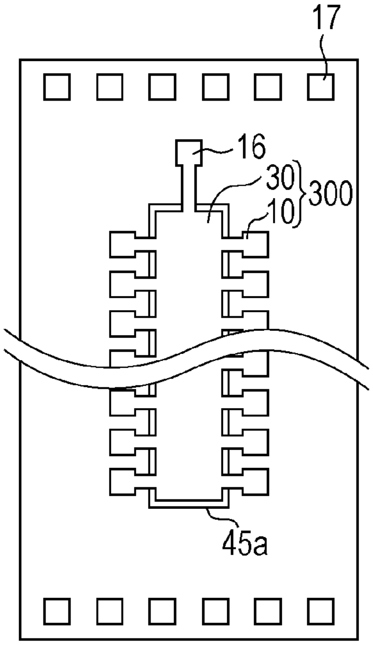
FIGS. 7A to 7D are views schematically illustrating the top view of a liquid ejection head.
Figure 7B:
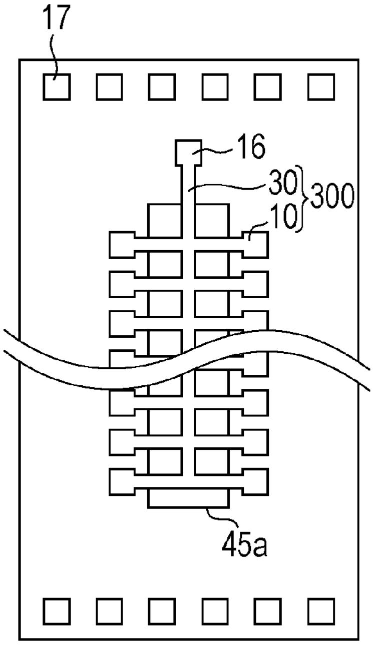
Figure 7C:
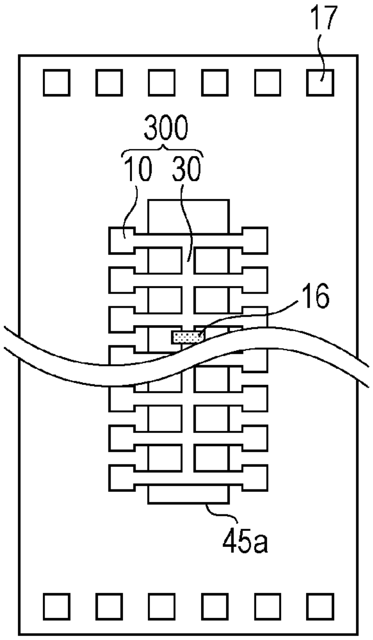

As illustrated in FIGS. 7A and 7B, the protective portions formed from the metal material layer are individually disposed in plurality of portions corresponding to each of the energy generation elements 12. The protective portions are provided in such a manner as to be continuous to the connecting portion 30 connected to the inspection terminal 16 for performing conduction check and are electrically connected to the connecting portion 30 in common. As illustrated in FIG. 7C, the inspection terminal 16 can also be provided on the region 45*a* where the supply port is opened.

Next, a voltage is applied between the inspection terminal 16 and the terminals 17 electrically connected to the plurality of energy generation elements 12 to thereby confirm the insulation of the insulating layer 8 between the energy generation elements 12 and the protective portions 10 (inspection process). When it is confirmed that they are not conducting, it can be confirmed that the insulation of the insulating layer 8 is secured.

Also in this embodiment, by providing the protective portions 10 corresponding to the plurality of protective portions in such a manner as to be connected to one inspection terminal 16 and performing an inspection using the inspection terminal 16, the inspection of the insulating layer corresponding to the plurality of energy generation elements 12 can be collectively performed by one conduction check. Thus, the inspection of the plurality of insulating layer 8 covering the plurality of energy generation elements 12 can be efficiently performed.

In this embodiment, by providing commonality of portions forming the connecting portion 30 and the protective portions 10, the electrical connection of a dedicated layer constituting the connecting portion 30 and the protective portions 10 can be simplified.

Figure 6B:
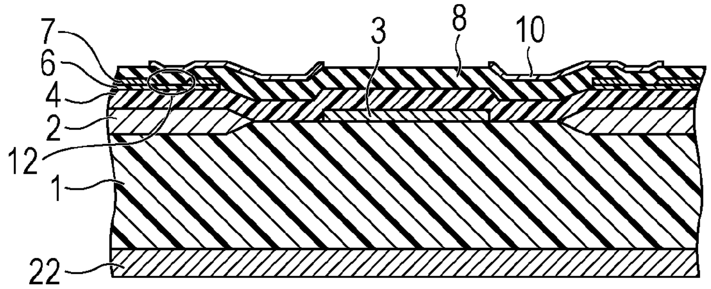
Figure 7D:
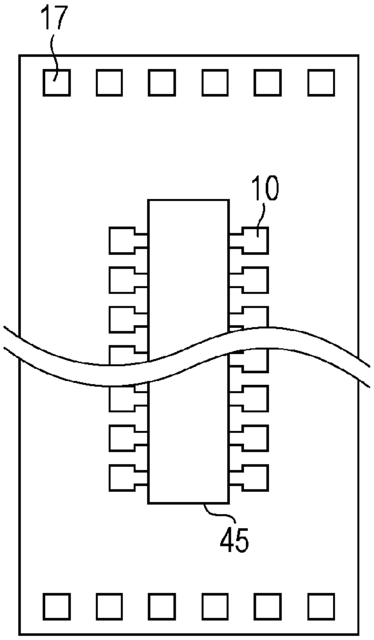

Next, the connecting portion 30 of the metal layer 300 is removed by etching, and processed into the plurality of protective portions 10 each positioned above each of the energy generation elements 12 and electrically disconnected from each other (FIG. 6B). When the inspection terminal and the connecting portion 30 are disposed as illustrated in FIG. 7C, the inspection terminal and the connecting portion are removed and the protective portions 10 corresponding to the plurality of protective portions are electrically disconnected from each other as illustrated in FIG. 7D. Thus, a liquid ejection head having high reliability can be achieved in which even when a hole is formed in the insulating layer due to a certain factor during recording operation, only one pair of one energy generation element 12 and the protective layer therefor is conducting and an electrochemical reaction, such as oxidization or elution, of the protective portion 10 can be prevented from transmitting to the other protective portions.

The connecting portion 30 on the insulating layer 8 may be suitably dry etched in such a manner as to be sufficiently removed and is suitably over-etched until the surface portion of the insulating layer 8 is removed. A level difference of several nanometers arises in the surface portion of the insulating layer 8 by performing such over etching. However, the level difference does not arise on portions of the energy generation elements 12, and therefore the ejection operation is not influenced. Moreover, by removing the connecting portion 30 in such a manner as not to project to the position (end) where the supply port 45 is opened, the protective portion 10 can be prevented from separating due to liquid flow resistance.

Figure 6C:
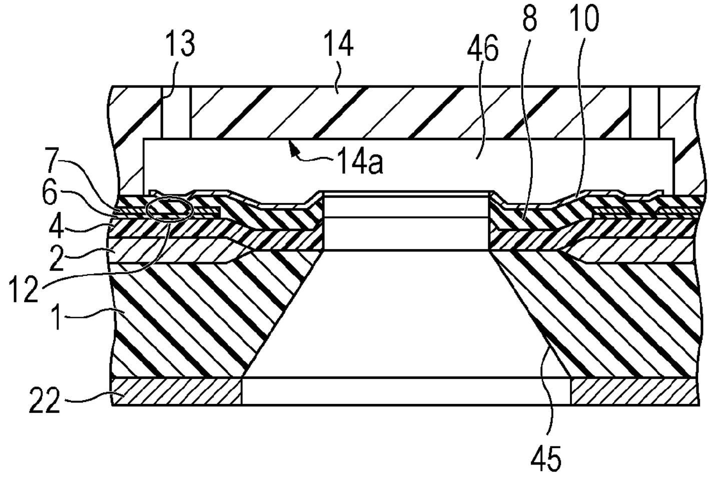

Then, the flow path wall member 14, the ejection port 13, and the supply port 45 are formed in the same manner as in the first embodiment (FIG. 6C).

As described in the second embodiment, the supply port 45 may be formed using a dry etching method.

Fourth Embodiment

A fourth embodiment will be described with reference to FIG. 8 as viewed at the position of the same cross section as in FIG. 2A. In the third embodiment, the connecting portion 30 is removed before providing the flow path wall member 14. The fourth embodiment describes a method for removing the connecting portion 30 after providing the flow path wall member 14, unlike the third embodiment.

Figure 8A:
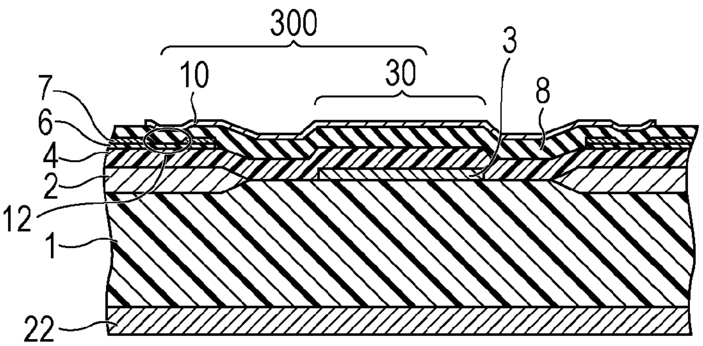
FIGS. 8A to 8C are views illustrating a method for manufacturing a liquid ejection head.

A base having the metal layer 300 having the protective portions 10 and the connecting portion 30 is prepared in the same manner as in the third embodiment (FIG. 8A).

Next, a voltage is applied between the inspection terminal 16 and the terminals 17 electrically connected to the plurality of energy generation elements 12 in the same manner as in the third embodiment to thereby confirm the insulation of the insulating layer of a portion between the energy generation elements 12 and the protective portions (inspection process).

Figure 8B:
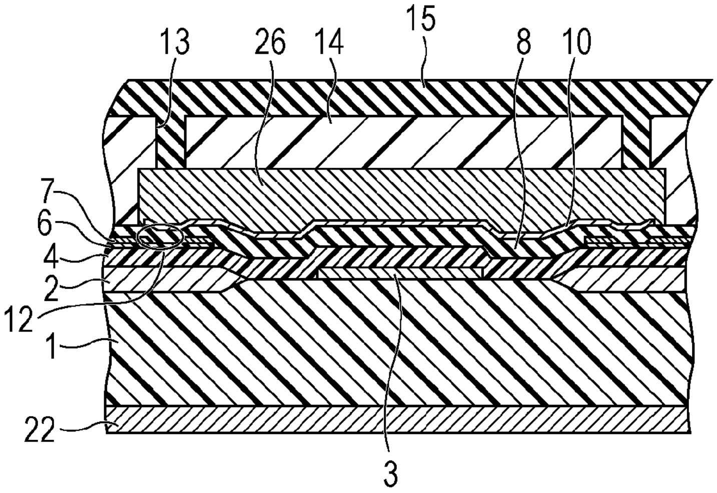

Next, the flow path wall member 14 and the ejection ports 13 are provided, and the flow path wall member 14 is protected with the cyclized rubber layer 15 in the same manner as in the third embodiment (FIG. 8B).

Next, the supply port 45 is formed and further the heat storage layer 4 and the insulating layer 8 located above the supply port 45 are removed using a dry etching method. This can also be performed in the same manner as in the third embodiment.

Figure 8C:
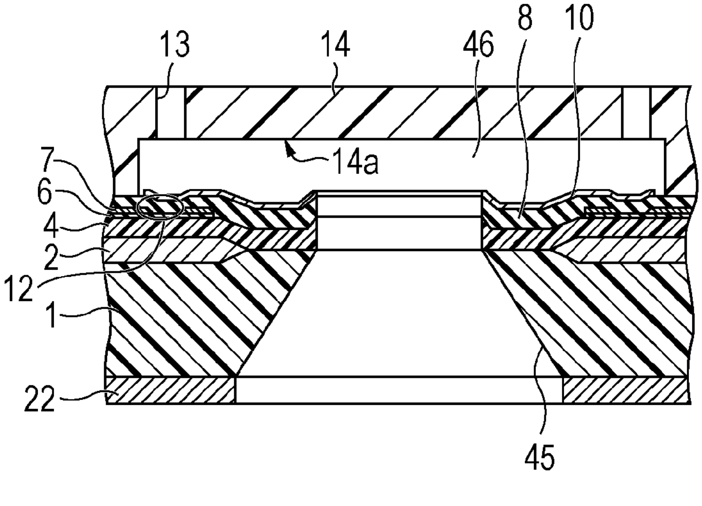

Subsequently, the connecting portion 30 of the metal layer 300 is removed by etching using gas capable of selectively etching the materials of the metal layer 300, and then the metal layer 300 is processed in such a manner as to form the plurality of protective portions 10 that are located above each of the energy generation elements 12 and electrically disconnected from each other. In this etching, an etching mask for exclusive use is not provided, and any one or plurality of the inner wall of the supply port 45, the heat storage layer 4, and the opening of the insulating layer 8 is/are utilized as an etching mask. Thereafter, the cyclized rubber layer 15 and the die material 26 are removed, whereby the liquid ejection head 41 is completed (FIG. 8C).

By etching the connecting portion 30 of the metal layer 300 through the supply port 45 from the rear surface of the base 1 of the liquid ejection head 41, it is not required to form an etching mask for exclusive use in removing the connecting portion 30, and thus the manufacturing processes can be reduced.

Also in the third embodiment and the fourth embodiment, the supply port 45 can also be provided by dry etching methods or laser processing or combining the same.

Figure 9A:
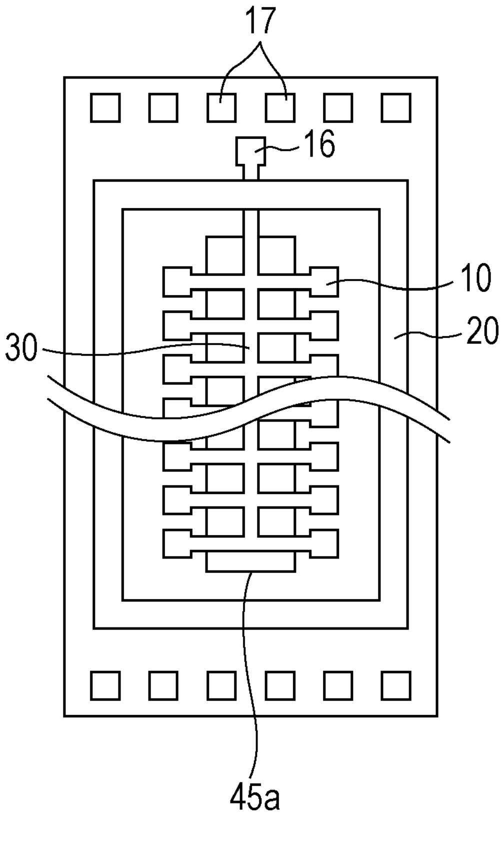
FIGS. 9A and 9B are views schematically illustrating the top view of a liquid ejection head.
Figure 9B:
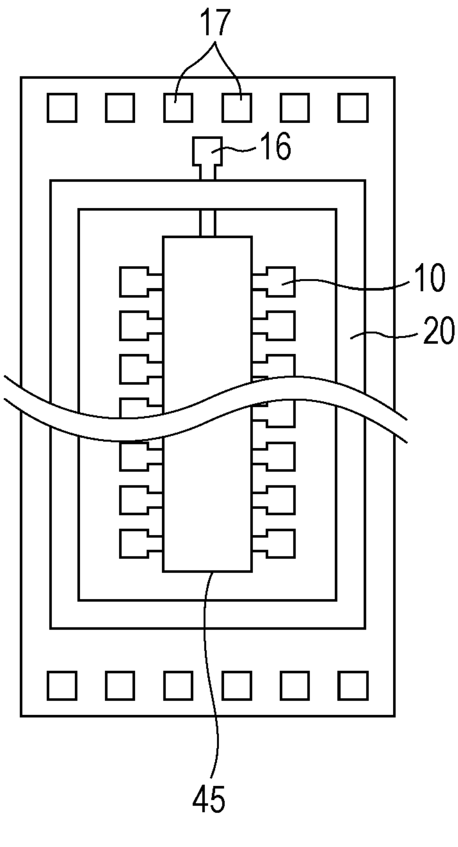

Also in all the embodiments, another protective layer 20 may be provided at a portion other than portions above the energy generation elements 12 using the same metal materials as in the protective portions 10 as illustrated in FIGS. 9A and 9B. By providing the protective layer 20 at a portion where the liquid ejection head 41 becomes defective when a hole or the like is formed in the insulating layer 8, and performing conduction check between the protective layer 20 and a lower layer, the reliability of the liquid ejection head 41 can be secured. Mentioned as the portion where the protective layer 20 is provided is a switching element that outputs ON/OFF for driving or not driving the energy generation elements 12 or a drive circuit, such as an AND circuit outputting a driving signal thereto or a line connecting the AND circuit and the terminals 17.

By providing the protective layer 20 in such a manner as to be connected to the inspection terminal 16 to which the protective portions 10 are connected, and performing conduction check, the reliability of not only the insulating layer 8 on the energy generation elements 12 but the insulating layer 8 on the switching element or the drive circuit can be confirmed by one conduction check. By providing the protective layer 20 and the protective portions 10 from the same metal material layer, it is not necessary to increase another manufacturing process, and the protective portions can be simply provided.

Furthermore, in the case of a liquid ejection head having plurality of supply ports 45, the inspection can be performed by one conduction check by connecting the respective connecting portion 30 to one inspection terminal 16.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189512 filed Aug. 26, 2010, which is hereby incorporated by reference herein in its entirety.

What is claimed is:

1. A method for manufacturing a substrate for a liquid ejection head which includes a plurality of energy generation elements that contain a material that generate heat by energization and that generate thermal energy for ejecting liquid, an insulating layer that contains an insulating material and that is provided to cover the plurality of energy generation elements, and a plurality of protective members for protecting the plurality of energy generation elements, the plurality of protective members containing a metal material and each of the protective members is provided corresponding to one of the energy generation elements in such a manner as to cover the insulating layer, the method comprising:

preparing a base on which the plurality of energy generation elements, the insulating layer, and the plurality of protective members are laminated and in this order, the base includes an inspection terminal for inspecting an insulation between the plurality of energy generation elements and the plurality of protective members and a connecting portion that electrically connects the inspection terminal and the plurality of protective members;

inspecting a conduction between the inspection terminal and the plurality of energy generation elements in order to inspect the insulation; and removing at least a part of the connecting portion to electrically disconnect the plurality of protective members from each other after the step of inspecting connection.

2. The method for manufacturing a substrate for the liquid ejection head according to claim 1, wherein the protective members contain any one of tantalum, iridium, and ruthenium.

3. The method for manufacturing a substrate for the liquid ejection head according to claim 1, wherein the connecting portion is provided above the base at a position where a penetration hole is provided that serves as a supply port for supplying liquid and that penetrates the base.

4. The method for manufacturing a substrate for the liquid ejection head according to claim 3, wherein the penetration hole is formed in the base and also the plurality of protective members are electrically disconnected from each other in the step of removing.

5. The method for manufacturing a substrate for the liquid ejection head according to claim 1, wherein the plurality of protective members and the connecting portion are formed from different levels of layers.

6. The method for manufacturing a substrate for the liquid ejection head according to claim 1, wherein the part of the connecting portion is removed using a wet etching method using an alkaline solution in the step of removing.

7. The method for manufacturing a substrate for the liquid ejection head according to claim 6, wherein an etching rate with which the alkaline solution etches the connecting portion is greater than an etching rate with which the alkaline solution etches the base.

8. The method for manufacturing a substrate for the liquid ejection head according to claim 1, wherein the connecting portion contains a material containing aluminum or polysilicon.

9. The method for manufacturing a substrate for the liquid ejection head according to claim 1, wherein the plurality of protective members and the connecting portion are formed from the same level of layer containing the metal material.

10. A method for manufacturing a liquid ejection head, comprising:

preparing a substrate for the liquid ejection head using the manufacturing method according to claim 1; and providing a flow path wall member having a flow path wall communicating with an ejection port for ejecting liquid and contacting the substrate for the liquid ejection head to thereby constitute the flow path on the substrate for the liquid ejection head.

* * * * *